United States Patent [19]
Jones

[11] 3,948,475
[45] Apr. 6, 1976

[54] HEADLIGHT MOUNTING BRACKET

[76] Inventor: Ronald W. Jones, 1217 Eastside Road, El Cajon, Calif. 92020

[22] Filed: Sept. 13, 1974

[21] Appl. No.: 505,549

[52] U.S. Cl. .......... 248/226 R; 248/251; 211/105.4; 240/7.55
[51] Int. Cl.² .......................................... E06B 7/28
[58] Field of Search ........ 248/57, DIG. 6, 251, 259, 248/226 R, 323, 354 S, 354 R, 354 C; 211/105.3, 105.4, 123, 124; 403/296; 24/201 A, 265 B, 265 CD; 240/7.55, 57, 58

[56] References Cited
UNITED STATES PATENTS

| | | | |
|---|---|---|---|
| 1,061,658 | 5/1913 | Bradshaw | 248/354 S |
| 1,612,124 | 12/1926 | Huelsick | 248/354 S |
| 1,723,970 | 8/1929 | Jauch | 248/354 S |
| 2,510,938 | 6/1950 | Boots | 24/265 B |
| 2,584,292 | 2/1952 | Rogers | 240/57 |
| 3,099,400 | 7/1963 | Holmes | 240/7.55 |
| 3,493,739 | 2/1970 | Lipski | 240/58 |

FOREIGN PATENTS OR APPLICATIONS
828,091   1/1952   Germany .......................... 248/354 S

*Primary Examiner*—Roy D. Frazier
*Assistant Examiner*—Robert A. Hafer
*Attorney, Agent, or Firm*—Brown & Martin

[57] ABSTRACT

A bracket for mounting a headlight assembly between the fork tubes of a motorcycle. The bracket includes an elongated central body member with integral adjustment bolts extending from both ends. Engagement sleeves are received over the adjustment bolts and positioned along the adjustment bolts by sleeve nuts. The headlight is secured to the central body member. The bracket is secured between the fork tubes by operation of the adjustment nuts forcing the engagement sleeves into frictional engagement with the fork tubes.

3 Claims, 3 Drawing Figures

HEADLIGHT MOUNTING BRACKET

BACKGROUND OF THE INVENTION

The production headlight assembly on motorcycles is frequently replaced by a custom or modified headlight assembly. These custom headlights are added both for their appearance and for improved lighting performance. It is the practice, according to the prior art, to manufacture a custom bracket to mate such custom headlight assemblies to a particular motorcycle. There is no headlight mounting bracket, according to the prior art, that is compatible with a substantial percentage of headlight and motorcycle combinations. The performance of prior art brackets is particularly unacceptable with respect to the installation of high quality custom headlight assemblies because such assemblies generally incorporate a mounting flange at the lower terminal portions from which protrudes a single fixed mounting bolt. Thus such assemblies require a bracket that provides for both mounting, positioning and aim adjustment.

Therefore, it is desirable to have a headlight mounting bracket that is adaptable to a wide variety of motorcycles, including variations in the fork tube spacing, and fork tube size, and which supports the headlight in proper position with adjustable aim. Such a bracket is particularly desirable where it is an attractive complement to the appearance of the headlight and the motorcycle, and where it substantially reduces the labor requirement for installation and removal of the headlight.

SUMMARY OF THE INVENTION

An exemplary embodiment of the invention incorporates a generally cylindrical elongated body member with integral adjustment bolts extending from opposite ends. The adjustment bolts are threaded to receive a pair of sleeve adjustment nuts. Engagement sleeves are received over the threaded adjustment bolts and are frictionally engaged by the sleeve adjustment nuts on planar terminal engagement walls of the engagement sleeves. The opposite end of the engagement sleeves incorporate arcuate concave surfaces for engagement with the exterior of the generally cylindrical fork tubes.

The central body member has a flange mounting recess for the flange portion of the headlight that comprises an enlarged and recessed flat portion of the generally cylindrical body member. A nut flat is positioned opposite the flange mounting recess. A transverse bore extends between the flange mounting recess and the nut flat to accomodate the mounting bolt of the headlight assembly.

It is therefore an object of the invention to provide a new and improved motorcycle headlight mounting bracket.

It is another object of the invention to provide a new and improved motorcycle headlight mounting bracket which fits a wide range of motorcycles without modification.

It is another object of the invention to provide a new and improved motorcycle headlight mounting bracket which requires only a simple wrench for installation.

It is another object of the invention to provide a new and improved motorcycle headlight mounting bracket which properly centers the headlight between the fork tubes.

It is another object of the invention to provide a new and improved motorcycle headlight mounting bracket that provides a frictionally maintained adjustment of headlight aim.

It is another object of the invention to provide a new and improved motorcycle headlight mounting bracket that may be quickly removed together with the associated headlight assembly, such as for off-road use of the motorcycle.

It is another object of the invention to provide a new and improved motorcycle headlight mounting bracket that presents an attractive appearance complementing that of the headlight and motorcycle.

It is another object of the invention to provide a new and improved motorcycle headlight mounting bracket that accomodates headlight assemblies with a single mounting bolt extending from a mounting flange.

Other objects and many attendant advantages of the invention will become more apparent upon a reading of the following detailed description, together with the drawings in which like reference numerals refer to like parts throughout and in which.

Figure 1:
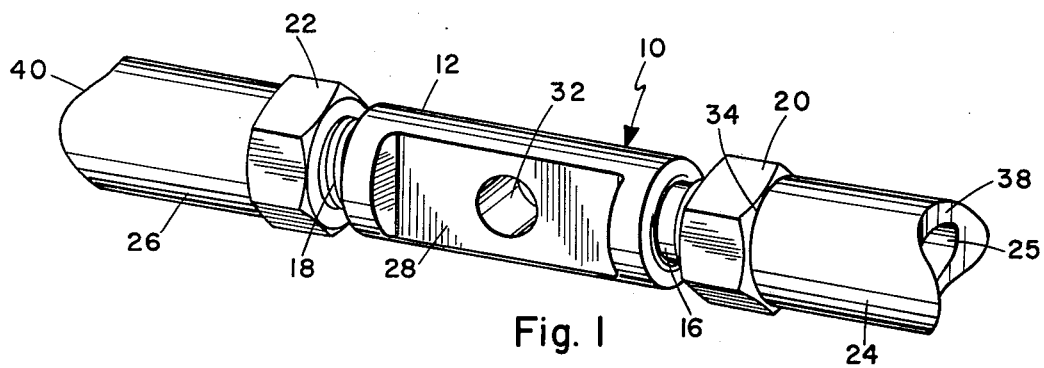
FIG. 1 is a perspective view of the mounting bracket.
Figure 2:
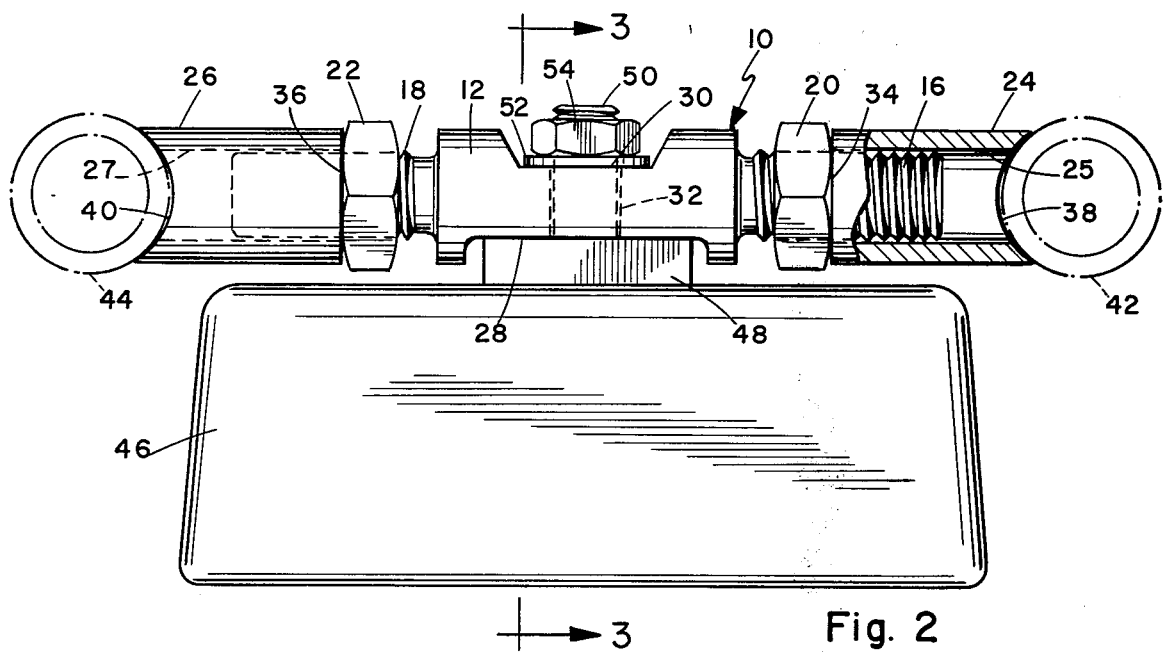
FIG. 2 is a top plan view, with portions cut away, of the bracket mounted on a motorcycle.
Figure 3:
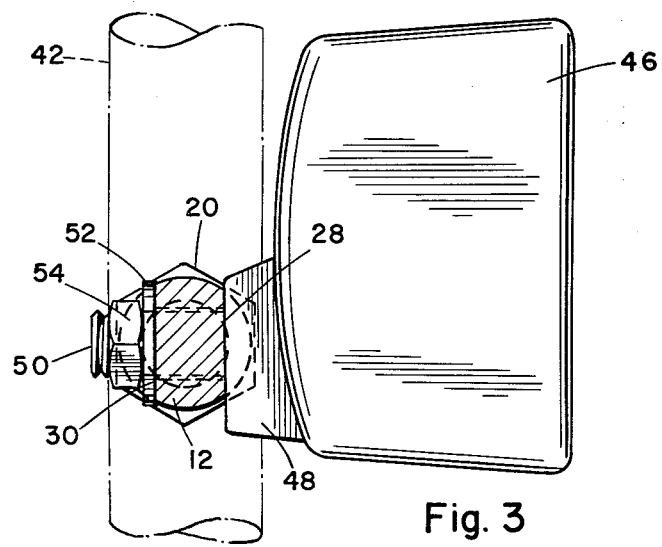
FIG. 3 is a sectional view taken on line 3—3 of FIG. 2 and rotated 90°.

Referring now to the drawings, there is illustrated a bracket 10. The bracket comprises a central body member 12 which is a generally cylindrical elongated member terminating in integral adjustment bolts 16 and 18 at opposite ends. The adjustment bolts 16 and 18 have sleeve adjustment nuts 20 and 22 threaded thereon. A pair of engagement sleeves 24 and 26 are received over the exposed terminal portions of the adjustment bolts 16 and 18. The engagement sleeves 24 and 26 are generally cylindrical in configuration and have central bores 25 and 27 sized to be slidably received over the adjustment bolts 16 and 18. The inner ends of the adjustment sleeves are cut off flat to form planar end walls 34 and 36. The end walls 34 and 36 are frictionally engaged by the faces of the adjustment nuts 20 and 22. The opposite ends of the engagement sleeves are formed into arcuate concave engagement ends 38 and 40. The engagement ends 38 and 40 have a radius of curvature that is complementary to the exterior curvature of the motorcycle fork tubes 42 and 44 respectively.

Referring specifically to FIG. 1, the central body member 12 includes a headlight flange mounting recess 28 which comprises a flat mounting surface in the generally cylindrical body 12. Diametrically opposed to the flange mounting recess 28 is a nut flat 30. The flange mounting recess 28 and nut flat 30 are connected by a transverse bore 32. A motorcycle headlight assembly 46 is received on the central body member 12. The mounting flange portion 48 of the headlight assembly 46 engages the flange mounting recess 28. The mounting bolt 50 passes through the transverse bore 32 and extends beyond the nut flat 30. A conventional washer 52 and nut 54 are utilized to secure the headlight in position.

OPERATION

In installing a motorcycle headlight assembly utilizing the bracket 10 according to the invention, the sleeve adjustment nuts 20 and 22 are rotated inwardly to reduce the overall dimension of the bracket 10 so that it can be positioned transversly between fork tubes 42 and 44. The sleeve adjustment nuts 20 and 22 are then rotated outwardly to force the engagement sleeves 24 and 26 outwardly until they engage the fork tubes 42 and 44. Further operation of the adjustment nuts 20 and 22 creates a firm engagement between the arcuate concave engagement ends 38 and 40 of the engagement sleeves 24 and 26 and the fork tubes 42 and 44. A frictional engagement is also produced between the inner end walls 34 and 36 of the engagement sleeves 24 and 26 and the respective sleeve adjustment nuts 20 and 22. The headlight assembly 46 is then attached by inserting the bolt 50 through the bore 32 and securing the headlight assembly 46 against the flange mounting recess 28 by the washer 52 and nut 54 acting against the nut flat 30. Aim adjustment of the headlight assembly 46 is accomplished by rotating the headlight about the axis of the bracket 10 with sufficient force to overcome the friction between the nut flats and planar end walls 34 and 36 of the engagement sleeves 24 and 26. The provision of two engagement sleeves 24 and 26 ensures that the headlight can be centrally positioned between the fork tubes.

The arcuate concave engagement ends 38 and 40 of the engagement sleeves are shown as having the same radius of curvature as for the outside diameter of the fork tubes 42 and 44. In practice, the engagement ends 38 and 40 are sized to have a curvature which corresponds to the smallest diameter fork tubes generally encountered. Such engagement ends function well with larger diameter fork tubes as well. The selection of this radius of curvature for the engagement ends 38 and 40 prevents any rocking or other relative movement that would otherwise occur if the radius of curvature for the engagement ends was greater than that of a particular fork tube.

If it is desired to remove the headlight assembly 46 such as for off-road use, it is only necessary to loosen the adjustment nuts 20 and 22 a sufficient distance so that the engagement sleeves 24 and 26 clear the fork tubes 42 and 44, whereupon the light assembly 46 and bracket 10 may be removed and stored for later use. The generally cylindrical configuration for the body member 12 and sleeves 24 and 26 creates a harmony in the visual appearance of the bracket with that of the usual headlight design and with that of the motorcycle fork tubes, giving the installation a custom appearance. In appropriate cases the bracket may be of anodized brushed aluminum finish, or may be made from chrome plated steel to more fully conform to the principle portions of the motorcycle.

Having described my invention, I now claim:

1. A headlight mounting bracket for mounting a headlight between the fork tubes of a motorcycle wherein the improvement comprises:

an elongated central body member including means for mounting a headlight on said central body member, a pair of threaded adjustment bolts fixedly secured to, and extending from opposite ends of, said central body member, a sleeve adjustment nut threadably received on each of said adjustment bolts, an engagement sleeve received over each of said adjustment bolts each said sleeve having a first end frictionally contacting said adjustment nuts, each said engagement sleeve movable in a longitudinal direction along the axis of said bolt without rotation in response to said adjustment not being rotatably moved along the axis of said bolt, said engagement sleeve having second arcuate concave engagement ends for frictionally engaging the frame tubes of a motorcycle and holding a headlight on said central body member in a selected position and selected headlight aim, said sleeves comprise generally cylindrical members with a central bore sized to receive said adjustment bolts, said first ends of said sleeve having generally planar end walls oriented at 90° to the central axis of said sleeves, and said end walls being of a diameter to engage a face of said nuts.

2. A headlight mounting bracket for mounting a headlight between the fork tubes of a motorcycle according to claim 1, wherein:

said central body member comprises generally cylindrical body with a planar flange engagement recess and an oppositely oriented nut flat recess.

3. A headlight mounting bracket for mounting a headlight between the fork tubes of a motorcycle according to claim 1, wherein, said central body member comprises a generally cylindrical body with a planar flange engagement recess and an opposite oriented nut flat recess, said nut flat recess and said planar flange engagement recess being connected by a bore through said central body member.

* * * * *